United States Patent
Del Pino Ruiz et al.

(10) Patent No.: US 11,886,404 B2
(45) Date of Patent: Jan. 30, 2024

(54) AUTOMATED DATABASE MODELING

(71) Applicant: Optum Services (Ireland) Limited, Dublin (IE)

(72) Inventors: Vicente Rubén Del Pino Ruiz, Dublin (IE); Hendrik Kleine, Dublin (IE); Harutyun Shahumyan, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 473 days.

(21) Appl. No.: 17/144,906

(22) Filed: Jan. 8, 2021

(65) Prior Publication Data
US 2022/0222229 A1 Jul. 14, 2022

(51) Int. Cl.
G06F 16/00 (2019.01)
G06F 16/21 (2019.01)
G06F 16/2455 (2019.01)

(52) U.S. Cl.
CPC ........ *G06F 16/217* (2019.01); *G06F 16/2455* (2019.01)

(58) Field of Classification Search
CPC ... G06F 16/217; G06F 16/2455; G06F 16/211
See application file for complete search history.

(56) References Cited

U.S. PATENT DOCUMENTS

| | | | |
|---|---|---|---|
| 5,404,510 A | 4/1995 | Smith et al. | |
| 7,133,876 B2 | 11/2006 | Roussopoulos et al. | |
| 7,895,191 B2 | 2/2011 | Colossi et al. | |
| 8,126,870 B2 | 2/2012 | Chowdhuri et al. | |
| 8,412,746 B2 | 4/2013 | Fox et al. | |
| 8,478,775 B2 | 7/2013 | Netz et al. | |
| 8,719,312 B2 | 5/2014 | Jin et al. | |
| 9,298,761 B2 | 3/2016 | Graefe | |
| 9,460,185 B2 | 10/2016 | Swift et al. | |

FOREIGN PATENT DOCUMENTS

CN 102737033 B 2/2015

OTHER PUBLICATIONS

"Extract, transform, load," Wikipedia, the Free Encyclopedia, last edited on May 14, 2020, Retrieved Apr. 14, 2021, from: https://web.archive.org/web/20200620051302/https://en.wikipedia.org/wiki/Extract,_transform,_load, Accessed date: Jun. 20, 2020, 9 pp.
"Stochastic gradient descent," Wikipedia, the Free Encyclopedia, last edited on Oct. 12, 2020, Retrieved Apr. 14, 2021 from: https://web.archive.org/web/20201022094018/https://en.wikipedia.org/wiki/Stochastic_gradient_descent, Accessed date: Oct. 22, 2020, 11 pp.

*Primary Examiner* — Paul Kim
(74) *Attorney, Agent, or Firm* — Shumaker & Sieffert, P.A.

(57) ABSTRACT

In general, this disclosure describes techniques for automatically restructuring a database to improve one or more parameters of the database. In some examples, a computing system is configured to extract a set of columns and merge the set of columns into a new table of a first new candidate model of the database; determine a table of the database based on a number of columns of that are involved in query "where" or "join" clauses; merge the table with one or more connected tables in a second new candidate model of the database, wherein the one or more connected tables are connected to the table by at least one of the "where" or "join" clauses; select a model of the database from among the candidate models based on one or more parameters; and use the selected model as the current model of the database.

20 Claims, 9 Drawing Sheets

AUTOMATED DATABASE MODELING

TECHNICAL FIELD

The disclosure relates to computing systems, and in particular, to databases managed by computing systems.

BACKGROUND

Data is stored in repositories, such as databases. Example types of databases may include relational databases, non-relational databases, streaming databases, and others. Conceptually, relational databases store data as rows and columns in a series of related tables. In contrast, non-relational databases store data based on models other than tabular relations. For example, non-relational databases may include document databases, key-value stores, graph stores, and column stores.

Queries may be used to access (e.g., write and retrieve) data stored in databases. Depending on the type of database, different querying languages are used to access the data stored in the databases. For example, a user may use a relational database query (e.g., a Structured Query Language (SQL) query) for querying a relational database. The relational database query may return data in rows of the relational databases. Alternatively, a user may use a non-relational database query (e.g., a NoSQL query) for querying a non-relational database, such as a document database. The non-relational database query may return, for example, a document containing the data, such as a JavaScript Object Notation (JSON) or eXtensible Markup Language (XML) document. Other data repositories include data lakes, static web pages, data streams, files stored to file systems, and others.

SUMMARY

In general, this disclosure describes techniques for automatically restructuring, (e.g., refining a structure, schema, or model of) a database so as to improve one or more properties of the database. In some examples, systems and techniques are disclosed to determine a model for a database that balances two or more opposing or conflicting constraints. As one non-limiting example, the techniques of this disclosure include "normalizing" (e.g., splitting) one or more tables of the database, so as to improve data-storage efficiency (e.g., abrogating redundant or duplicated data), and/or "denormalizing" (e.g., merging) one or more other tables of the database, so as to improve the database performance (e.g., the searchability or other usability). In this way, the techniques described herein may provide one or more technical advantages that provide at least one practical application. For example, the techniques described in this disclosure are configured to improve the performance of a computing system that manages or otherwise accesses a database, both by freeing up valuable memory space and simultaneously enhancing the speed of utilities or other applications running on the computing system.

In one example, the techniques described herein include a method performed by a computing system, the method comprising: storing, by a computing system, a current model of the database, wherein the database comprises one or more tables; storing, by the computing system, a set of one or more queries that characterize data to retrieve from the database; performing, by the computing system, a database-refinement process that comprises: performing, by the computing system, a process to generate a first new candidate model of the database, wherein the process to generate the first new candidate model of the database comprises: extracting, by the computing system, a target set of columns from a first table of the current model of the database; and merging, by the computing system, in the first new candidate model of the database, the target set of columns into a new table of the database; performing, by the computing system, a process to generate a second new candidate model of the database, wherein generating the second new candidate model of the database comprises: determining, by the computing system, a second table of the current model of the database based on a number of columns of the second table that are involved in "where" or "join" clauses of the queries; and merging, by the computing system, in the second new candidate model of the database, the second table with one or more connected tables of the database, wherein the one or more connected tables are connected to the second table at by least one of the "where" or the "join" clauses of the queries; selecting, by the computing system, a model of the database from among a set of models of the database that includes the current model of the database, the first new candidate model of the database, and the second new candidate model of the database; and using, by the computing system, the selected model of the database as the current model of the database.

In another example, the techniques described herein include a computing system comprising processing circuitry and a storage system, the processing circuitry configured to: store a current model of a database comprising one or more tables; store a set of one or more queries that characterize data to retrieve from the database; perform a database-refinement process that comprises: performing a process to generate a first new candidate model of the database, wherein the process to generate the first new candidate model of the database comprises: extracting a target set of columns from a first table of the current model of the database; and merging, in the first new candidate model of the database, the target set of columns into a new table of the database; performing a process to generate a second new candidate model of the database, wherein generating the second new candidate model of the database comprises: determining a second table of the current model of the database based on a number of columns of the second table that are involved in "where" or "join" clauses of the queries; and merging in the second new candidate model of the database, the second table with one or more connected tables of the database, wherein the one or more connected tables are connected to the second table by at least one of the "where" or the "join" clauses of the queries; selecting a model of the database from among a set of models of the database that includes the current model of the database, the first new candidate model of the database, and the second new candidate model of the database; and using the selected model of the database as the current model of the database.

In another example, the techniques described herein include a non-transitory computer-readable medium comprising instructions for causing one or more programmable processors to: store a current model of a database comprising one or more tables; store a set of one or more queries that characterize data to retrieve from the database; perform a database-refinement process that comprises: performing a process to generate a first new candidate model of the database, wherein the process to generate the first new candidate model of the database comprises: extracting a target set of columns from a first table of the current model of the database; and merging, in the first new candidate model of the database, the target set of columns into a new table of the database; performing a process to generate a second new candidate model of the database, wherein generating the second new candidate model of the database comprises: determining a second table of the current model of the database based on a number of columns of the second table that are involved in "where" or "join" clauses of the queries; and merging in the second new candidate model of the database, the second table with one or more connected tables of the database, wherein the one or more connected tables are connected to the second table by at least one of the "where" or the "join" clauses of the queries; selecting a model of the database from among a set of models of the database that includes the current model of the database, the first new candidate model of the database, and the second new candidate model of the database; and using the selected model of the database as the current model of the database.

The details of one or more examples are set forth in the accompanying drawings and the description below. Other features, objects, and advantages will be apparent from the description and drawings, and from the claims.

DETAILED DESCRIPTION

Data may be stored in different types of databases (e.g., databases arranged according to different structures or "schemas"), such as relational databases, non-relational databases, streaming databases, and others. For example, FIG. 1 depicts an example database 100, configured to store units of data 102 within individual cells that are arranged into a grid or table (e.g., table 108I) made up of rows 104 and columns 106.

Figure 1:
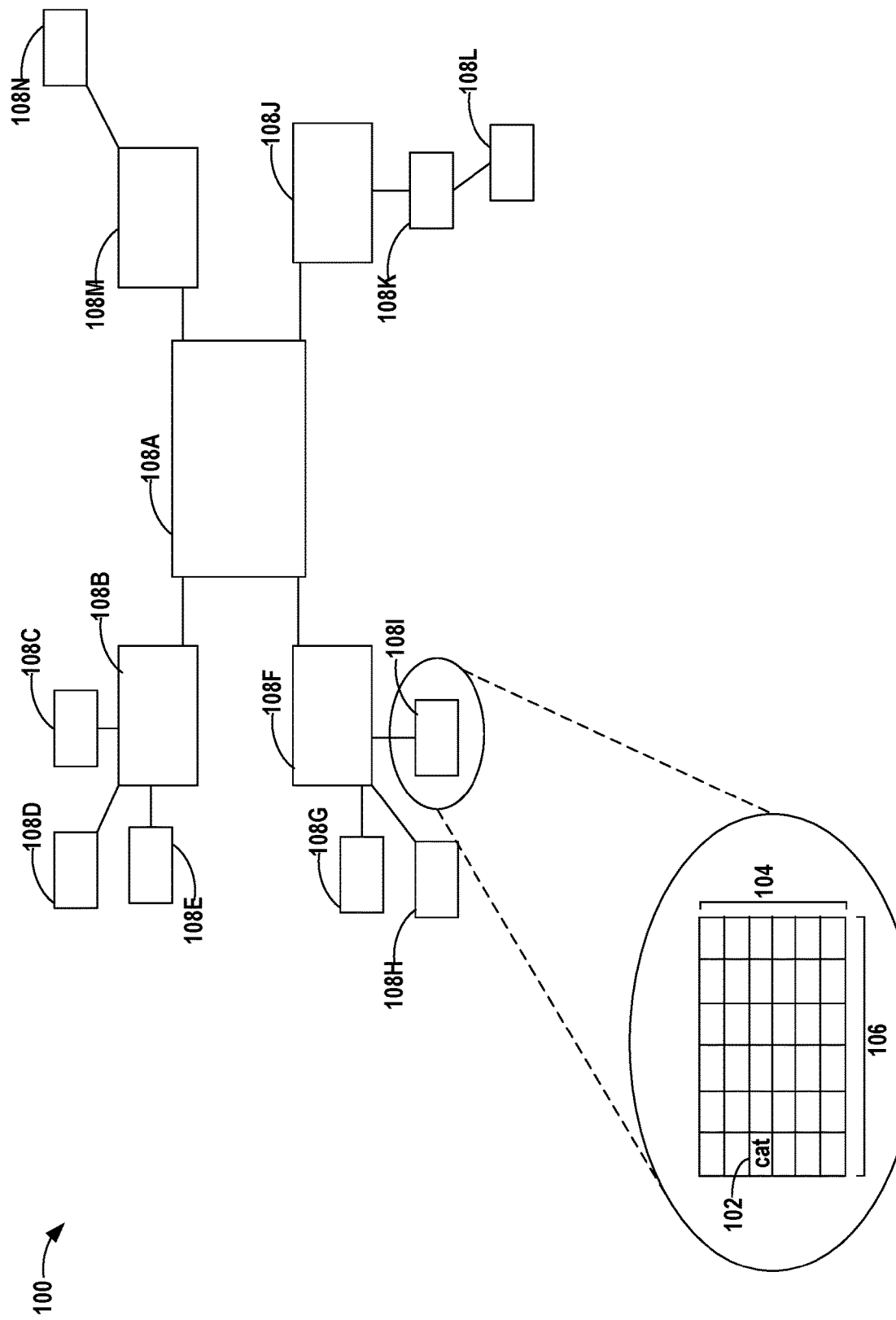
FIG. 1 is a conceptual diagram depicting an example database, in accordance with the techniques of this disclosure.

In the example shown in FIG. 1, database 100 is an example of a "relational" database, which includes a plurality of such tables 108A-108N (collectively, "tables 108"), each of which is interconnected with (e.g., related to) one or more other tables. It is to be understood that database 100 of FIG. 1 is merely one example illustrating of the concept of relational databases described herein, and is not intended to be limiting. The techniques of this disclosure may apply to virtually any relational database having any number of tables that are arranged and interconnected according to virtually any structure, schema, or model.

One advantage of distributing (or "normalizing") the data among a series of related tables 108 in this way is that redundant copies of data may be reduced or eliminated, as compared to a database having relatively fewer tables (e.g., a "denormalized" database) or even just a single table (e.g., a "fully denormalized" database), thereby conserving potentially valuable memory resources and/or satisfying memory constraints. However, the query performance (e.g., the searchability) of relational databases tends to decrease as the number of tables 108 increases, because queries must be executed over each of the tables 108 in order to retrieve the requested data.

Typically, the host computing system may compensate for the decreased performance of highly normalized databases by generating "indexes" that indicate how to locate data within database 100, such as data 102. Indexes may enable easier (e.g., faster) searches for the computing system, however, for large volumes of data, the indexes themselves may occupy enough storage space so as to defeat the purpose of normalizing the database 100 in the first place. Accordingly, for some such applications where indexes are not practical to use, a trade-off between conflicting constraints develops, which may be conceptualized as "read" (e.g., faster data search-and-retrieval) versus "write" (e.g., efficient data storage within memory).

More specifically, less-normalized or "denormalized" databases, having relatively fewer interconnected tables 108, may exhibit relatively improved query performance, or in other words, an increased speed (or equivalently, a reduced amount of elapsed time) to search for data 102 stored in the tables. However, denormalized databases may exhibit at least two disadvantages, primarily (1) a reduced storage efficiency, as redundant data tends to be duplicated throughout the tables 108, and (2) an increased extract-transform-load ("ETL") down-time whenever the stored data 102 is modified, so that redundant data may be copied throughout the table. During the ETL process, the database 100 may typically not be used (e.g., searched for data via queries).

Conversely, more-normalized databases, having relatively more interconnected tables 108, may more-efficiently store data, thereby conserving memory space. However, normalized databases tend to exhibit reduced query performance, or in other words, may take relatively longer to search for data 102 stored in the table, due to the more-complex structure, especially when tables of the database are stored at geographically distributed devices. In some examples, however, the query performance may vary based on the particular search query being executed. In other words, some queries may perform better than others, regardless of the underlying structure of the database.

According to the techniques of this disclosure, a computing system (e.g., one or more computing devices) is configured to automatically re-structure a database so as to improve or balance both the "read" and the "write" constraints. More specifically, the computing system is configured to identify one or more particularly resource-intensive tables 108 of the database and automatically merge (e.g., denormalize) the identified tables into existing interrelated tables to improve query performance, and/or split (e.g., normalize) the identified tables into new tables to free-up memory space (by deleting unnecessary redundant data), as appropriate. In some examples, the computing system may be configured to iteratively repeat this process until a sufficiently-improved or "optimal" table structure has been achieved. For example, the techniques described herein are configured to restructure database 100 in order to improve the performance of a set of queries that have previously or historically been executed over the database, under the assumption that similar queries are likely to be executed over database 100 in the future.

Figure 2:
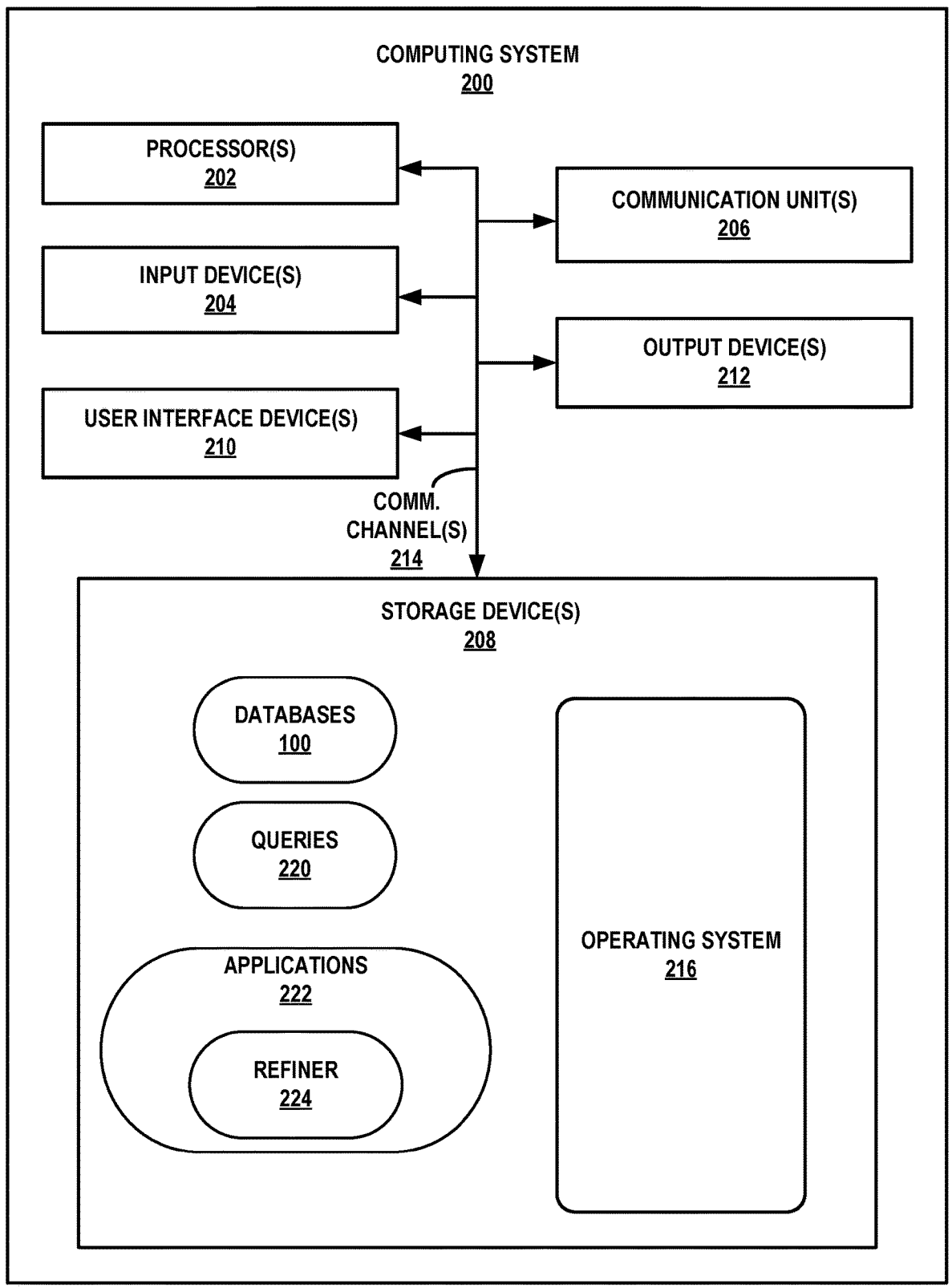
FIG. 2 is a block diagram depicting an example computing system configured to restructure a database, in accordance with one or more aspects of the techniques disclosed.

FIG. 2 is a block diagram of an example computing system 200 that operates in accordance with one or more techniques of the present disclosure. FIG. 2 may illustrate a particular example of a computing system having one or more computing devices, each computing device including one or more processors 202 and configured to automatically re-structure a database, such as database 100 of FIG. 1.

In the example of FIG. 2, computing system 200 may include a workstation, server, mainframe computer, notebook or laptop computer, desktop computer, tablet, smartphone, feature phone, and/or other programmable data-processing apparatus of any kind. In some examples, a computing system may be or may include any component or system that includes one or more processors or other suitable computing environment for executing software instructions and, for example, need not necessarily include one or more elements shown in FIG. 2 (e.g., communication units 206; and in some examples, components such as storage device(s) 208 may not be in the computing system 200).

As shown in the specific example of FIG. 2, computing system 200 includes one or more processors 202, one or more input devices 204, one or more communication units 206, one or more output devices 212, one or more storage devices 208, and one or more user interface (UI) devices 210. Computing system 200, in one example, further includes one or more applications 222 and operating system 216 that are executable by computing system 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214. In some examples, two or more of these components may be distributed across multiple (discrete) computing devices. In some such examples, communication channels 214 may include wired or wireless data connections between the various computing devices.

Processors 202, in one example, are configured to implement functionality and/or process instructions for execution within computing system 200. For example, processors 202 may be capable of processing instructions stored in storage device 208. Examples of processors 202 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing system 200 during operation. Storage device(s) 208, in some examples, are described as computer-readable storage media. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories known in the art. In some examples, storage device 208 is used to store program instructions for execution by processors 202. Storage device 208, in one example, is used by software or applications running on computing system 200 to temporarily store information during program execution. For example, as shown in FIG. 2, storage device 208 is configured to store operating system 216, one or more databases 100 (e.g., database 100 of FIG. 1), a set of historical queries 220 previously executed over database(s) 100, and various programs or applications 222, including a database-refiner module 224 (also referred to herein as "refiner 224"), in accordance with the techniques of this disclosure, as detailed further below.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing system 200, in some examples, also includes one or more communication units 206. Computing system 200, in one example, utilizes communication units 206 to communicate with external devices via one or more networks, such as one or more wired/wireless/mobile networks. Communication unit(s) 206 may include a network interface card, such as an Ethernet card, an optical transceiver, a radio frequency transceiver, or any other type of device that can send and receive information. Other examples of such network interfaces may include 3G, 4G, 5G and Wi-Fi radios. In some examples, computing system 200 uses communication unit 206 to communicate with an external device.

Computing system 200, in one example, also includes one or more user interface devices 210. User interface devices 210, in some examples, are configured to receive input from a user through tactile, audio, or video feedback. Examples of user interface device(s) 210 include a presence-sensitive display, a mouse, a keyboard, a voice responsive system, video camera, microphone or any other type of device for detecting a command from a user. In some examples, a presence-sensitive display includes a touch-sensitive screen.

One or more output devices 212 may also be included in computing system 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing system 200 may include operating system 216. Operating system 216, in some examples, controls the operation of components of computing system 200. For example, operating system 216, in one example, facilitates the communication of one or more applications 222 with processors 202, communication unit 206, storage device 208, input device 204, user interface device 210, and output device 212. Application 222 may also include program instructions and/or data that are executable by computing system 200.

Database-refiner module 224 is one example of an application 222 of computing system 200. Refiner 224 may include instructions for causing computing system 200 to perform techniques described in the present disclosure, for example, to perform a database-refinement process in order to automatically restructure a database, such as database 100 of FIG. 1. For example, in accordance with the techniques of this disclosure, and as detailed further below, refiner 224 is configured to perform a database-refinement process that includes analyzing various parameters of database 100 and generating one or more candidate models for restructuring database 100 so as to improve upon the analyzed parameters. Refiner 224 may then compare the performance of the proposed new candidate database models to the performance of the "current" database 100, and then select the model having the highest relative performance.

Figure 3:
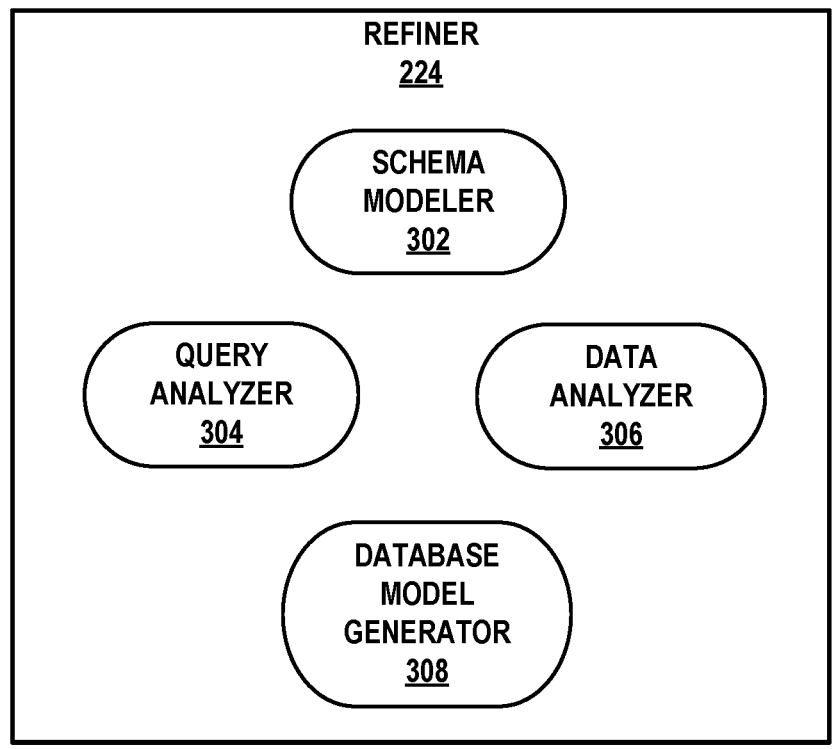
FIG. 3 is a block diagram depicting example components of the database refiner module of FIG. 1.

FIG. 3 is a block diagram illustrating example components or sub-modules of database-refiner module 224 ("refiner 224") of FIG. 2. For illustrative purposes and for ease of understanding, the functionality of the modules of FIG. 3 are described with reference to the example database 100 of FIG. 1 and the example computing system 200 of FIG. 2. As shown in FIG. 3, refiner 224 includes schema modeler 302, query analyzer 304, data analyzer 306, and database model generator 308. In other examples, refiner 224 may include more, fewer, or different components.

Refiner 224, via modules 302, 304, 306, and 308, is configured to perform a database-refinement process. For example, refiner 224 includes schema modeler 302, configured to determine (e.g., retrieve, extract, and/or construct, as necessary) the current schema of a database, such as database 100 stored in memory 208 of computing system 200 of FIG. 2. The "schema" or model of database 100 includes a description, indication, or representation of all of the tables 108 of database 100 and their respective hierarchical relationships to one another, and also a description, indication, or representation of all of the columns 106 in each table. Schema modeler 302 may retrieve information necessary to determine the current model of database 100 from any suitable source, such as a metastore for database 100, from an existing (e.g., previously constructed) model stored in memory 208, or from other data sources.

Schema modeler 302 may store the current model in memory in the form of a graph model, which is known in the mathematical field of graph theory to be a set of vertices, points, or nodes, that are interconnected by edges or lines. In one example, the graph model may include the extracted entities (e.g., tables 108 and/or columns 106) as vertices of the graph, and may further include the relationships between the entities as edges connecting the vertices. Two non-limiting examples of graph-modeling software that may be configured to generate such graph models include Neo4J of Neo4J, Inc. of San Mateo, California, and TigerGraph of TigerGraph, Inc. of Redwood City, California.

Refiner 224 further includes query analyzer 304. Query analyzer 304 is configured to determine (e.g., extract or retrieve) a set of past or "historical" queries 220 (e.g., search clauses) that have previously been executed over the database. Query analyzer 304 may obtain the historical queries 220 from any suitable source, such as from a log of queries 220 stored within memory 208, or from an analytics layer of computing system 200. For example, some commercial analytics-layer software often stores an openly accessible copy of all queries 220 executed in the run-time environment, including, for each query 220, data indicative of the user or entity who executed the query, and the amount of time elapsed while executing the query. In some examples, analytics-layer software may store additional information, such as what data is read from memory while executing the query. In other examples, the analytics-layer software may retrieve this additional information with an application programming interface (API).

In some examples, query analyzer 304 is configured to automatically retrieve all queries 220 that have been executed over the database during a pre-determined time period (or "window" of time or "timeframe"), e.g., during the past six months, or any other suitable duration. In other examples, the historical time period may be user-customizable. For example, query analyzer 304 may be configured to prompt a user (e.g., an administrator) or otherwise receive user input indicating the desired timeframe from which to retrieve historical queries 220.

Query analyzer 304 is then configured to identify, from among the retrieved historical queries 220, one or more "low performance" queries, which, as described above, may indicate excessive normalization of database 100 (or of a branch of tables of database 100). For example, query analyzer 304 may be configured to categorize each of the retrieved queries 220 into either binary category of "low-performance queries" or "high-performance queries" (or equivalently, "under-performing queries" and "performant queries," respectively). Query analyzer 304 may use any or all of a number of different metrics to assess or quantify the relative performance of each query 220. As one example, query analyzer 304 may identify as "low performance" any queries that have required an above-threshold amount of time to execute (e.g., locate and return requested data). As another example, query analyzer 304 may identify as "low performance" any queries 220 that required an above-threshold amount of computing resources (e.g., a number of CPU cores, processor cycles, memory read operations, disk access requests, etc.) in order to execute. As another example, query analyzer 304 may identify as "low performance" any queries 220 that resulted in an above-threshold amount of data read from memory 208 while executing the query, or more specifically, an amount of data "read" but not "needed." This type of read data may include columns involved in joining tables but not selected as a result of the query, and duplicated data in tables that must be discarded.

As another example applicable particularly to distributed computing systems, query analyzer 304 may identify as "low performance" any queries that resulted in an above-threshold amount of data transferred between different computing nodes while executing the query. For example, a large volume of data transferred between nodes in distributed systems is typically caused by "joins" between large tables. For example, this type of data may be represented by the number of tables involved in returning data for a query 220. The more tables involved in "join" clauses, the more data will be moved across distributed systems in what is known as "shuffling."

As one illustrative example, consider a computing system having a first node "A" and a second node "B." Node A stores a specific table "X" with keys [1-50], and node B stores table "Y" information with keys [1-50]. When a "join" operation is performed between tables X and Y, data is copied from X and Y. In this way, distributed systems having more nodes correspond to a larger amount of data to copy the cluster in a join operation.

Accordingly, techniques of this disclosure include restructuring a database so as to decrease the number of "unnecessary" joins between nodes. As one example, techniques for restructuring a database (in particular, a distributed database) may include using the same key to distribute tables (e.g., tables 108 of FIG. 1) across the computing system 200, thereby decreasing the volume of data required to be moved when joining the tables. However, similar to indexing, this feature is not available to (e.g., practical for) all databases. Further, similar to the user-customizable timeframe from which to retrieve historical queries 220, any or all of the above query-performance thresholds may also be user-customizable, such as selected by (e.g., received as user-input from) an administrator of computing system 200.

Some distributed computing systems are configured such that certain data elements (e.g., records) are duplicated across tables that are stored at multiple nodes. Duplicating the data elements across tables stored at multiple nodes may decrease the total amount of data transferred across nodes while executing certain queries, but may increase resource demand when those data elements are modified. For instance, in the previous example of a distributed database having tables "X" and "Y," some computing systems may be configured to automatically include copies of some or all of the data elements in tables that are stored at different nodes. Thus, instead of having particular data elements stored only in table X (where table X is stored in node A), the same particular data elements may be stored in both in table X and table Y (where table Y is stored in node B). Thus, a common subset of data elements may be stored within both tables X and Y. With this approach, copies of the particular data elements need not be transferred between (or from) both nodes A and B while performing a "join" operation of a query that retrieves the particular data elements (e.g., based on a query that references only one of tables A or B). Not transferring copies of the particular data elements from separate nodes may increase the query performance. However, when updating the particular data elements, the update must be executed twice (e.g., once per table in which the particular data elements are stored). Thus, when copies of the particular data elements are stored in more and more tables, more and more computationally "expensive" operations may need to be executed to update the particular data elements.

Further, although this data duplication may decrease the amount of data transferred between nodes, the total amount of stored data stored increases, thereby reducing available memory space and increasing the ETL (e.g., update) downtime whenever the data is modified. Accordingly, techniques of this disclosure include restructuring a database so as to reduce the amount of data transferred between nodes of a distributed computing system while executing a query, without also duplicating excessive amounts of data into each node.

In some examples, but not all examples, the query-performance metrics of "elapsed time" and/or "used computing resources" may both depend on (e.g., be correlated with) the additional metrics of "amount of data read" and/or "amount of data transferred," as described above. Accordingly, query analyzer 304 may use the "data-read" and/or "data-transferred" metrics to evaluate the performance of each of queries 220, thereby indirectly evaluating two or more performance parameters simultaneously. More specifically, in accordance with the techniques of this disclosure, query analyzer 304 is configured to use the number of tables joined in a query as a metric of query performance, thereby indirectly representing both the "amount of data read from the disk" and the "amount of data moved between computing nodes" query-performance metrics.

For example, query analyzer 304 is configured to determine (e.g., generate or calculate), for each query "q" of the set of all retrieved historical queries 220 ("Q"), a Query Performance Coefficient ("QPC"). For each query q, the QPC is generally indicative of, for example, unnecessary "join" clauses, dispersed data, and/or columns of tables (e.g., columns 106 of tables 108 of FIG. 1) that are used in "join" clauses, "where" clauses, and "select" clauses in query q. As one example, query analyzer 304 may calculate the QPC for a query q as shown in Equation 1, below:

$$QPC(q) = \sum_{t \in T} \frac{C(t) - [S(t) + J(t) + F(t)]}{|T| * C(t)} * w_{j_w} \quad (1)$$

In the above equation, QPC represents the Query Performance Coefficient for a particular query q, determined as a sum over the set of all tables T involved in query q, wherein a particular table t includes a total number of columns C(t), a number of columns S(t) that were used in a "select" clause in query q, a number of columns J(t) that were used in a "join" clause in query q, and a number of columns F(t) that were used in a "where" clause in query q. The "|T|" indicates the total number of individual tables t within the set of all tables T involved in queries Q.

For a particular query q, the QPC generally indicates the relative proportion of "unnecessary" tables, such as tables that have previously been split off from another table, tables that are used only for filtering data, or tables that are only used as bridge tables. As described further below, refiner 224 is configured to improve the query performance of database 100 (e.g., reduce the QPC for one or more of queries Q) by merging unnecessarily split tables, thereby reducing the total number of tables involved in each query q.

In some examples, but not all examples, the QPC may further depend on a weight factor $w_{j_w}$ configured to weight (e.g., increase or decrease, as desired by a user) the effect of a particular table t if S(t) equals zero, e.g., if table t does not have any columns that were used in a "select" clause in query q. Weight factor $w_{j_w}$ may be provided (e.g., customized) by a user, e.g., the administrator of computing system 200 (FIG. 1). For example, there may be scenarios in which the administrator wants to "penalize" (e.g., increase the relative effect on the QPC of) tables having a relatively large proportion of unused columns.

After determining the QPC for each query q of the set of retrieved historical queries 220 (Q), query analyzer 304 may determine (e.g., calculate), a Database Query Performance ("DQP"), as the average of all of the calculated QPCs for the individual queries q. In some examples, query analyzer 304 may calculate the DQP as shown in Equation (2), below:

$$DQP = \sum_{q \in Q} \frac{QPC(q)}{|Q|} \quad (2)$$

In Equation (2), "|Q|" indicates the total number of individual queries q in the set of retrieved queries Q within the selected historical timeframe.

Refiner 224 further includes data analyzer 306. Data analyzer 306 of refiner 224 is configured to determine (e.g., extract or generate) and analyze information indicative of the storage-efficiency for data 102 contained within database 100, e.g., information indicating a relative type, amount, and/or a location of duplicated or redundant data. An indication of the amount of duplicated data may be referred to as the "selectivity." As described above, excessive amounts of duplicated data may be indicative of an excessively denormalized database 100 (or of a table 108 of database 100, or of a branch of tables 108 of database 100).

In some examples, data analyzer 306 is configured to retrieve relevant storage information from logs of database utilities or tools, such as utilities used to load database 100 and/or to load statistics of database 100 (e.g., metadata of database 100). For example, commercial ETL utilities often generate such information automatically, which data analyzer 306 may then retrieve. In other examples, such as when the administrator manually (or in other examples, when computing system 200 automatically) accesses the database via command-line code (e.g., via programming languages such as Spark from the Apache Software Foundation of Wakefield, Massachusetts) instead of via higher-level commercial database software, data analyzer 306 may extract the relevant storage information from the execution plans in the logs of each command execution via the command interface.

In some examples, data analyzer 306 determines, retrieves, or extracts, for each table t of the set of all tables T involved in the set of retrieved historical queries 220 ("Q"), a plurality of different categories (e.g., types) of relevant data-storage information, including, but not limited to, the following categories. A first category of data-storage information includes an amount of time elapsed while loading table t from memory 208. For example, the more data that is duplicated (e.g., the lower selectivity), the more data that will need to be deleted or updated during the ETL process, corresponding to a longer time to refresh the table. A second category of data-storage information includes dependencies of the table t (e.g., other tables that are linked to table t within the database). For example, the more duplicated data (e.g., the lower selectivity), the fewer table dependencies will be present because more tables will be merged together. A third category of data-storage information includes an indication of data 102 of table t that is has been re-written or updated. For example, a higher selectivity corresponds to a more-normalized database model, and accordingly, a lower amount of data needing to be re-written or updated. A fourth category of data-storage information includes an indication of data 102 of table t that is duplicated within other tables. For example, a lower selectivity corresponds to more duplicated data in the respective table. And a fifth category of data-storage information includes certain data-storage statistics, such as (but not limited to): a percent of cells of table t storing "null" values, a percent of values within table t that are duplicated, a percent of values of table t that are unique (e.g., distinct), or other similar data-storage statistics.

In some examples, one or more of these data-storage information categories may not be directly available to be retrieved from either the stored execution logs or from the automatically generated database statistics, in which case data analyzer 306 may be configured to determine (e.g., calculate) the information directly. Once retrieved and/or calculated, data analyzer 306 is further configured to store the collected information in memory, such as in a partition of storage repository 208 including database 100.

In some examples, the data-storage information categories indicative of "data duplicated across multiple tables" and/or data-storage statistics may also be utilized by query analyzer 304 in order to determine the weight factor $w_{j_w}$, as described above. For example, query analyzer 304 may use this information to weight the QPC for a particular query q in order to reduce the number of tables involved in the query by merging some tables into other tables, or in some examples, to reduce the number of columns moved across tables 108).

In some examples herein, data analyzer 306 is configured to split a column off of one table and merge the column into an additional table (or moving the column across different granularities), in order to modify the volume of data stored in database 100. That is, for the same amount of information (e.g., the same number of distinct or unique values of data 102) contained within database 100, the required amount of storage decreases (or equivalently, the amount of available storage increases).

As one illustrative example, database 100 may include a table storing a list of mailing addresses, having a first column for relatively high-granularity (e.g., highly specific) data that is unique to each row, such as the street and unit number, and having a second column for relatively low-granularity (e.g., more generic) data that is common to all rows, such as the country (e.g., "USA"). In some such examples, data analyzer 306 may be configured to split the "Country" column off into a new table that is related to the original table, wherein the new "Country" table includes just a single entry for "USA" in a single row and column (e.g., a single cell), thereby decreasing the file size of the database while maintaining the same number of unique data entries. In accordance with this disclosure, data analyzer 306 is configured to intelligently select columns to split off into a new table in a way that reduces the total amount of stored data, rather than redundantly duplicating data into an additional table.

For instance, based on the retrieved, extracted, and/or generated information, data analyzer 306 is configured to determine (e.g., calculate), for every column c of every table t of database 100, a Column Selectivity coefficient CS(c, t). In some examples, data analyzer 306 may calculate the CS for a particular column c of a particular table t as shown in Equation (3), below:

$$CS(c, t) = \frac{DV(c, t)}{NR(c, t)} \qquad (3)$$

In Equation (3), CS(c,t) represents the Column Selectivity coefficient for a particular column c of a table t, determined as the ratio of the number of distinct values DV (e.g., the number of unique or different values of data 102) within column c to the total number of rows NR in column c. The Column Selectivity CS(c,t) is generally indicative of whether a particular column c in a table t is currently at an "optimal" level (e.g., within a threshold range) of detail, or instead, if the column c includes an excessive number of duplicated values and should be merged into another table (e.g., another one of tables 108) of database 100.

After determining the Column Selectivity coefficient CS(c, t) for every column c within the set of all columns C of each table t in database 100, data analyzer 306 is configured to identify every column of each table t that has a column selectivity CS that is below a predetermined selectivity threshold (e.g., as defined by the administrator). For each table t, data analyzer 306 defines a corresponding set or group of columns containing these identified below-threshold columns (i.e., columns with Column Selectivity coefficients below the selectivity threshold).

In some examples, data analyzer 306 is configured to generate a different "joint group" for every possible combination or permutation of below-threshold columns within a particular table. For example, for a given table having below-threshold columns A, B, and C, data analyzer 306 may generate joint groups of columns including: A; B; C; AC; BC; and ABC. In this way, data analyzer 306 segregates out, from each table t, the columns containing the lowest levels of data detail (e.g., the columns with the lowest ratios of unique or distinct values to the total number of values, or equivalently, the columns with the most duplicated data). Data analyzer 306 selects these joint groups of columns as candidates for normalizing, e.g., for splitting off into new tables.

In some examples, data analyzer 306 may further calculate, for each table t within the set of all tables T involved in queries Q, a Table Selectivity coefficient TS(t). Data analyzer 306 may calculate TS(t) as the average of the Column Selectivity coefficients CS(c,t) for every column c (of the set of all columns C) within the table t:

$$TS(t) = \sum_{c \in C} \frac{CS(c, t)}{|C|} \quad (4)$$

In Equation (4), the absolute value of C ("|C|") indicates the total number of individual columns within the set of all columns C involved in queries Q.

Data analyzer 306 may then calculate a "global" Database Selectivity coefficient DS as the inverse of the average Table Selectivity coefficient TS(t) for every table t (within the set of all tables T) involved in queries Q:

$$DS = \frac{1}{\sum_{t \in T} \frac{TS(t)}{|T|}} \quad (5)$$

The Database Selectivity DS generally indicates an amount of duplicated data within database 100. More specifically, a relatively lower DS coefficient is correlated with a relatively lower amount of duplicated data stored within tables 108 of database 100.

Refiner 224 further includes database model generator 308. For ease of understanding, the functionality of database model generator 308 is described with reference to the example database models illustrated in FIGS. 4A-4C. For example, database model generator 308 is configured to intelligently generate one or more new candidate database models 410A-410C (FIGS. 4A-4C, respectively), each of which comprises a potentially improved structure for database 100 with respect to both query performance and data-storage efficiency.

Database model generator 308 is configured to receive the "current" graph model of database 100 from schema modeler 302, the set of historical queries 220 and Query Performance Coefficients from query analyzer 304, the data statistics and Selectivity Coefficients from data analyzer 306, and in some examples, an "evolving rate threshold" value from a user, as discussed in greater detail below.

As described above, data analyzer 306, on behalf of (e.g., prompted by) database model generator 308, is configured to generate a set of all columns having a Column Selectivity CS that is lower than a predetermined (or user-customizable) threshold selectivity. The selected value for the CS threshold influences the size of the set of below-threshold columns. For example, the lower the CS threshold, the more columns will be included in the set, and conversely, the higher the CS threshold, the fewer columns will be included in the set.

Figure 4A:
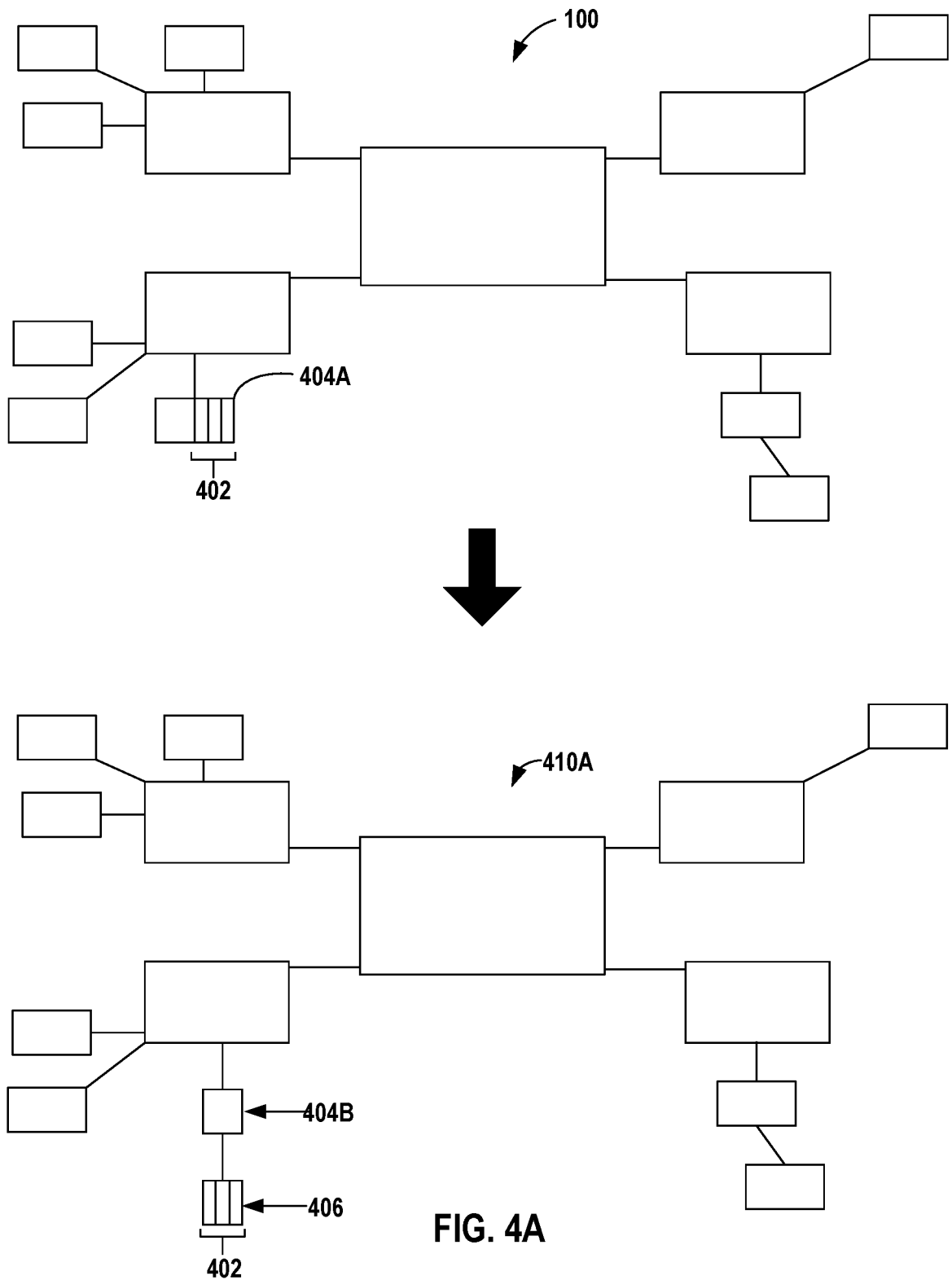
FIGS. 4A-4C are conceptual diagrams illustrating techniques for restructuring a database, in accordance with one or more aspects of the techniques disclosed.

Based on the set of individual below-threshold columns c, database model generator 308 (through data analyzer 306) generates smaller groups (e.g., subsets) of columns 106, wherein each group includes below-threshold columns that are currently stored within a common table t. For each group of columns, database model generator 308 calculates the joint selectivity, e.g., treats each group of below-threshold columns as a distinct "table" and calculates the Table Selectivity TS (as defined above) for the group. As shown in FIG. 4A, database model generator 308 then identifies (e.g., returns) the joint group of columns 402 having the lowest-overall Table Selectivity TS and "extracts" that group of columns 402 from their source table 404A. Database model generator 308 generates an "ALTER" statement (e.g., in Structured Query Language "SQL") to split the joint group 402 off into a new table 406 and "reduce" source table 404A into a smaller table 404B. By splitting columns 402 off from table 404A into a new table 406 in this way, database model generator 308 conceptually generates a first new candidate database model 410A, or equivalently, generates a first set of transformation (e.g., "ALTER") commands configured to convert the "current" model of database 100 into a first new candidate database model 410A.

In some examples, database model generator 308 may also generate and store new queries based on the new split table 406 (e.g., based on the first new candidate model 410A). For instance, when a table "A" is split into tables A1 and A2, for each query q1 that previously involved table A via "from" and "where" clauses of the query q1, database model generator 308 may generate a new query q2 having a "from" clause according to the form [A1.c1=A2.c2], and a "where" clause according to the form [A1.c1=condition x].

Figure 4B:
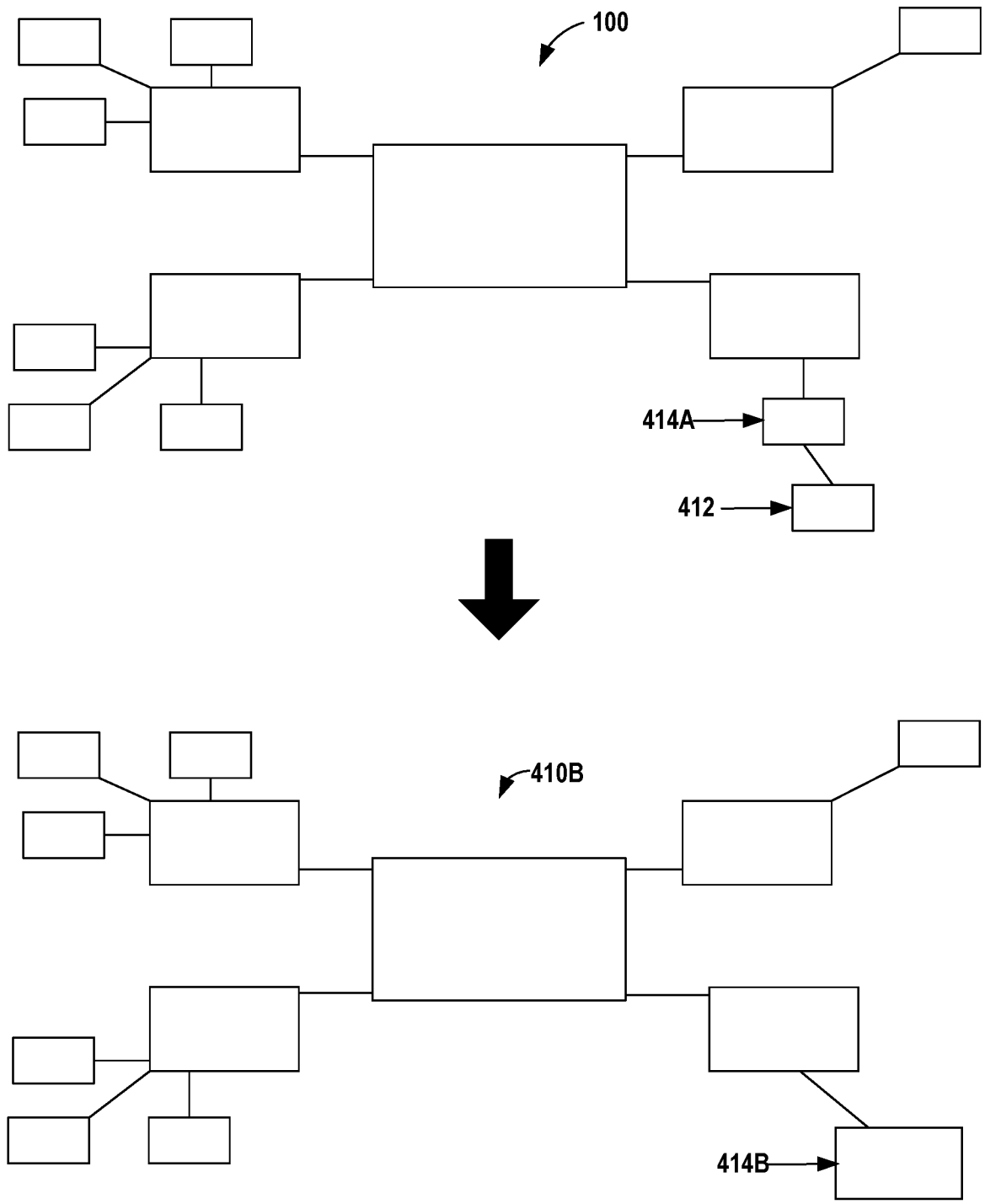

Additionally or alternatively, database model generator 308 is configured to identify, based on the information received from query analyzer 304, a set of "unnecessary" tables of database 100, such as tables that were involved in the set of past queries 220 wherein all of the columns in each of tables were involved only in "where" clauses and "join" clauses within the historical queries 220. As illustrated in FIG. 4B, database model generator 308 is configured to identify (e.g., return), from this set of "unnecessary" tables, the individual table 412 having the largest percent of columns involved only in "where" clauses and "join" clauses in historical queries 220.

As shown in FIG. 4B, database model generator 308 is configured to merge the identified table 412 into nearby (e.g., related) table 414A, e.g., tables that are connected to table 412 by the columns in the "where" and "join" clauses of the queries. For example, database model generator 308 may generate an "ALTER" statement to merge table 412 with table 414A connected by the columns in the "where" and "join" statements, in order to eliminate table 412 and form a "merged" table 414B.

By merging table 412 into table 414A to form merged table 414B in this way, database model generator 308 conceptually generates a second new candidate database model 410B, or equivalently, generates a second set of transformation (e.g., "ALTER") commands configured to convert the "current" model of database 100 into a second new candidate database model 410B. Database model generator 308 may also generate and store new queries based on the new merged table 414B (e.g., based on the second new candidate model 410B).

Figure 4C:
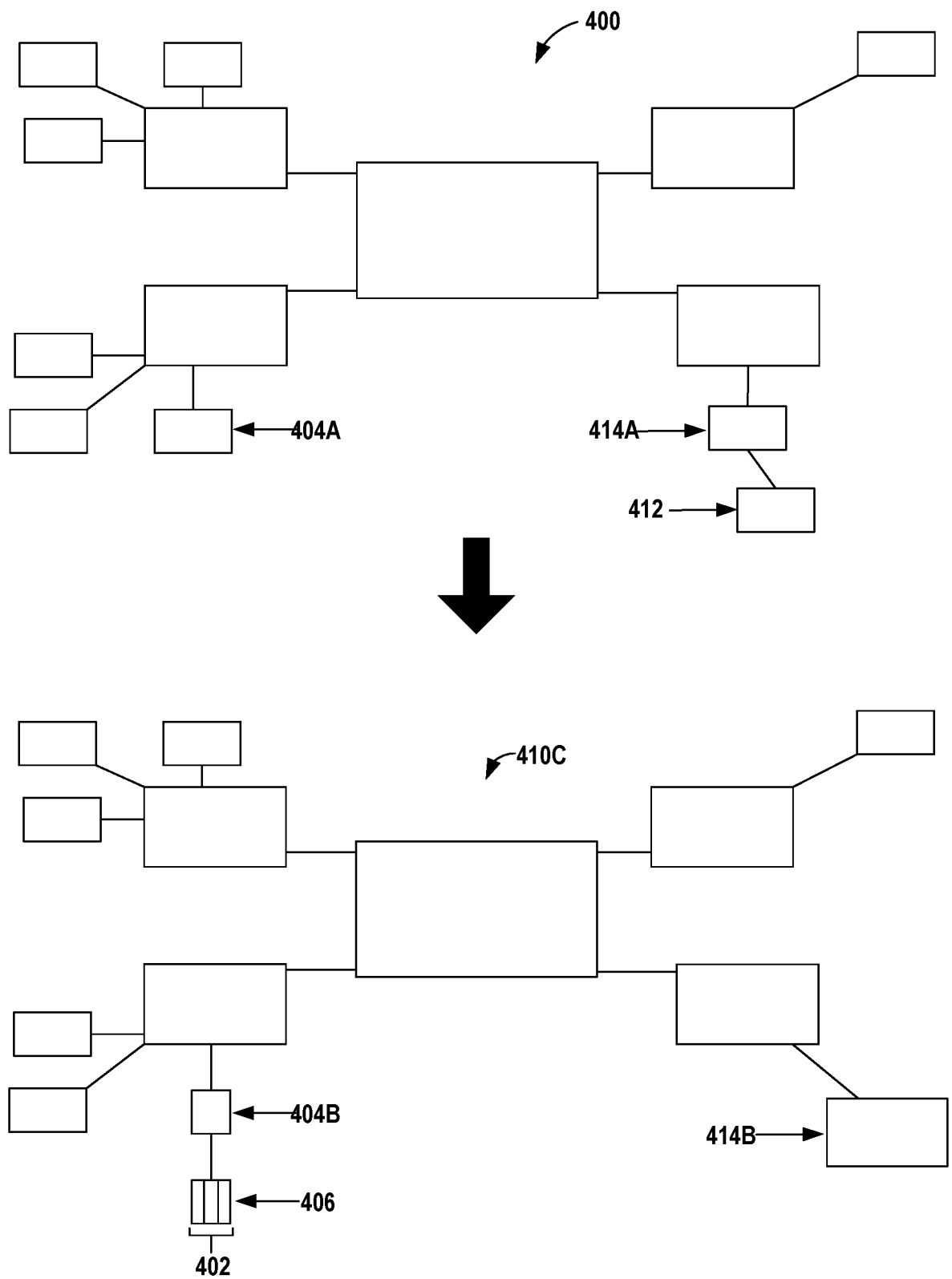

As depicted in FIG. 4C, in some examples, but not all examples, database model generator 308 generates a third new candidate database model 410C that incorporates both the new "split" table 406 from the first new candidate database model 410A and the "merged" table 414B from the second new candidate database model 410B (or equivalently, generates a third set of transformation ("ALTER")

commands configured to convert the "current" model of database 100 into the third new candidate database model 410C).

Database model generator 308 then generates a set of "global" performance metrics "$GP_x$": a first $GP_0$ for the "current" model of database 100, a second $GP_1$ for the first new candidate database model 410A; a third $GP_2$ for the second new candidate database model 410B; and in relevant examples, a fourth $GP_3$ for the third new candidate database model 410C, wherein the respective Global Performance metric $GP_x$ represents the sum of the respective Database Query Performance coefficient $DQP_x$ (as defined above) and the respective Database Selectivity coefficient $DS_x$ (as defined above), wherein x represents the identifier (e.g., 0, 1, 2, or 3) of the corresponding candidate database model:

$$GP_x = DQP_x + DS_x \tag{6}$$

Database model generator 308 then compares the Global Performance metrics to one another. In the event that the respective GP for one of the "new" candidate database models (e.g., $GP_1$, $GP_2$, or $GP_3$) is higher than $GP_0$ for the "current" database model, database model generator 308 identifies (e.g., returns) the respective database model having the highest GP metric, and substitutes the identified database model as the new "current" model for database 100. For example, database model generator 308 may execute the previously generated set of transformation ("ALTER") commands to convert the "current" model of database 100 into the "new" candidate database model having the highest GP metric.

The modules of refiner 224 are configured to iteratively repeat this database-refinement process until $GP_0$ is higher than all of $GP_1$, $GP_2$, and $GP_3$, in which case, the "current" model of database 100 has attained a sufficiently-improved model structure and needs no further refinement.

In some examples, computing system 200 is configured to receive, e.g., as user input, a user-customizable "evolving rate threshold" ("ERT") value. The ERT is an integer indicating the number of consecutive iterations for which database model generator 308 "refines" the new candidate models before comparing their respective performance metrics and selecting the highest-performing model from among the candidate models.

As one illustrative example, a user may submit an ERT value of "3." In such examples, refiner 224 evaluates the selectivity of the "current" model of database 100 and splits off a first new table, thereby forming a "first" intermediate database model. Refiner 224 then evaluates the selectivity of the first intermediate database model and splits off a second new table to form a "second" intermediate database model. Refiner 224 then evaluates the selectivity of the second intermediate model and splits off a third new table to form the final new candidate model 410A. Refiner 224 may then determine the Global Performance of the first new candidate model 410A and compare it to the respective GPs of the other candidate models.

In some cases, a relatively higher ERT value results in refiner 224 arriving at the "improved" model (e.g., having the locally highest GP metric) faster than in examples with relatively lower ERT values. However, a relatively higher ERT value also presents a greater risk of either "undershooting" or "overshooting" the optimal model, e.g., whenever the optimal number of merged and/or split tables is not an exact multiple of the ERT value. As one illustrative example, there may be a scenario in which the "final" improved model (e.g., as identified while refining the database according to an ERT value of "1") involves iteratively splitting five new tables from consecutive highest-performance candidate models. However, in the above example in which the ERT value is "3," database model generator 308 will first generate a first new candidate database model 410A having three new tables not present in the original model. During a second execution, database model generator 308 will generate a new candidate model 410A having an additional three tables (e.g., having a total of six tables not present in the original "current" model). At this stage, regardless of whether the new "current" model (with just three new tables) or the new candidate model (with six new tables) is higher-performing than the other, neither one of these options conforms fully to the actual "improved" model having a total of five additional tables. Accordingly, in some further examples, the ERT may be configured to automatically decrease with each completed iteration of refiner 224, so as to reduce the risk of skipping over a higher-performing database model.

Figure 5:
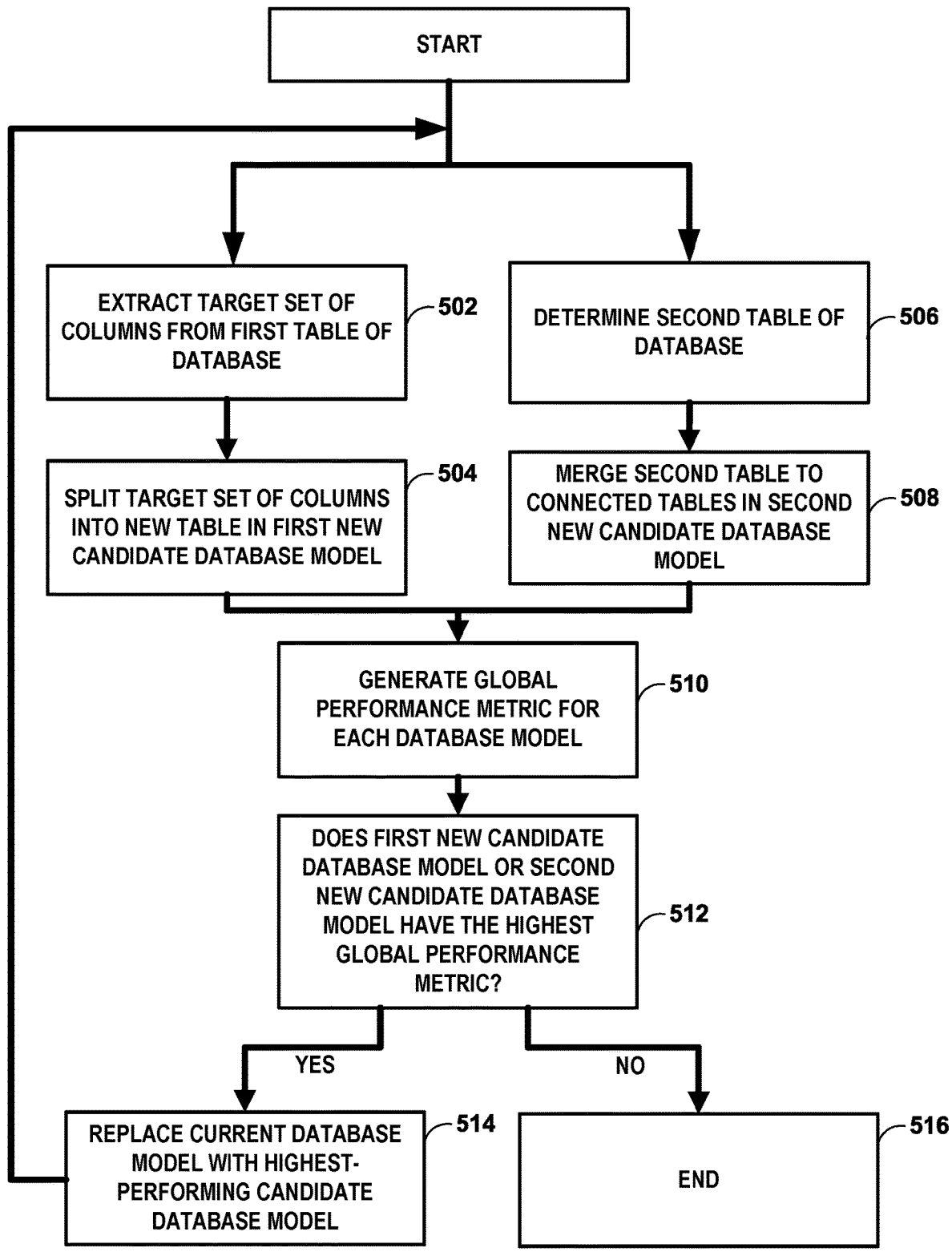
FIG. 5 is a flowchart illustrating an example database-refinement process, in accordance with one or more aspects of the techniques disclosed.

FIG. 5 is a flowchart illustrating an example database-refinement process, in accordance with one or more aspects of this disclosure. FIG. 5 is described with respect to the example computing system 200 described in FIG. 2 and the example databases depicted in FIGS. 1, 4A, and 4B.

Database-refiner module 224 (or "refiner 224") of computing system 200 is configured to identify and extract (e.g., remove) a set of columns 402 from a table 404A of a database 100 (502). For example, refiner 224 may identify the table 404A within database 100 having the largest, above-threshold amount of duplicated and redundant data 102 within its columns 402. Refiner 224 generates a first new candidate database model (e.g., model 410A of FIG. 4A) for database 100 by creating a new table 406 and populating the new table with the identified set of columns 402 (504).

Similarly, refiner 224 is configured to identify at least one "unnecessary" table 412 of database 100 that has contributed to (e.g., resulted in) below-threshold-performance queries (506). Refiner 224 generates a second new candidate database model (e.g., model 410B of FIG. 4B) for database 100 by merging the data previously stored within the identified table into surrounding related (e.g., interconnected) tables, such as into interconnected table 414A, and eliminating the identified table 412 (508).

Refiner 224 generates global-performance (GP) metrics for the current model of database 100, the first new candidate database model 410A and the second new candidate database model 410B (510). The GP metrics may indicate, for example, both the query performance for each database model and the data-storage efficiency for each database model. Refiner 224 may compare the GP metrics for each of the database models and may determine whether the first new candidate database model or the second new candidate database model has the highest GP metric (512), e.g., whether one of the "new" database models is higher-performing than the "current" database model. If either the first new candidate database model 410A or the second new candidate database model 410B has the highest GP metric ("YES" branch of 512), refiner 224 replaces the "current" model of database 100 with the highest-performing candidate database model, e.g., the candidate database model having the highest GP metric (514), and begins a subsequent iteration of the database-refinement process. If, however, refiner 224 determines that neither the first new candidate database model 410A nor the second new candidate database model 410B has the highest GP metric ("NO" branch of 512), e.g., the "current" database model is higher-performing than both of the "new" candidate database models 410A, 410B, then an improved database structure has been achieved with respect to queries 220 and refiner 224 takes no further refinement action (516).

Figure 6:
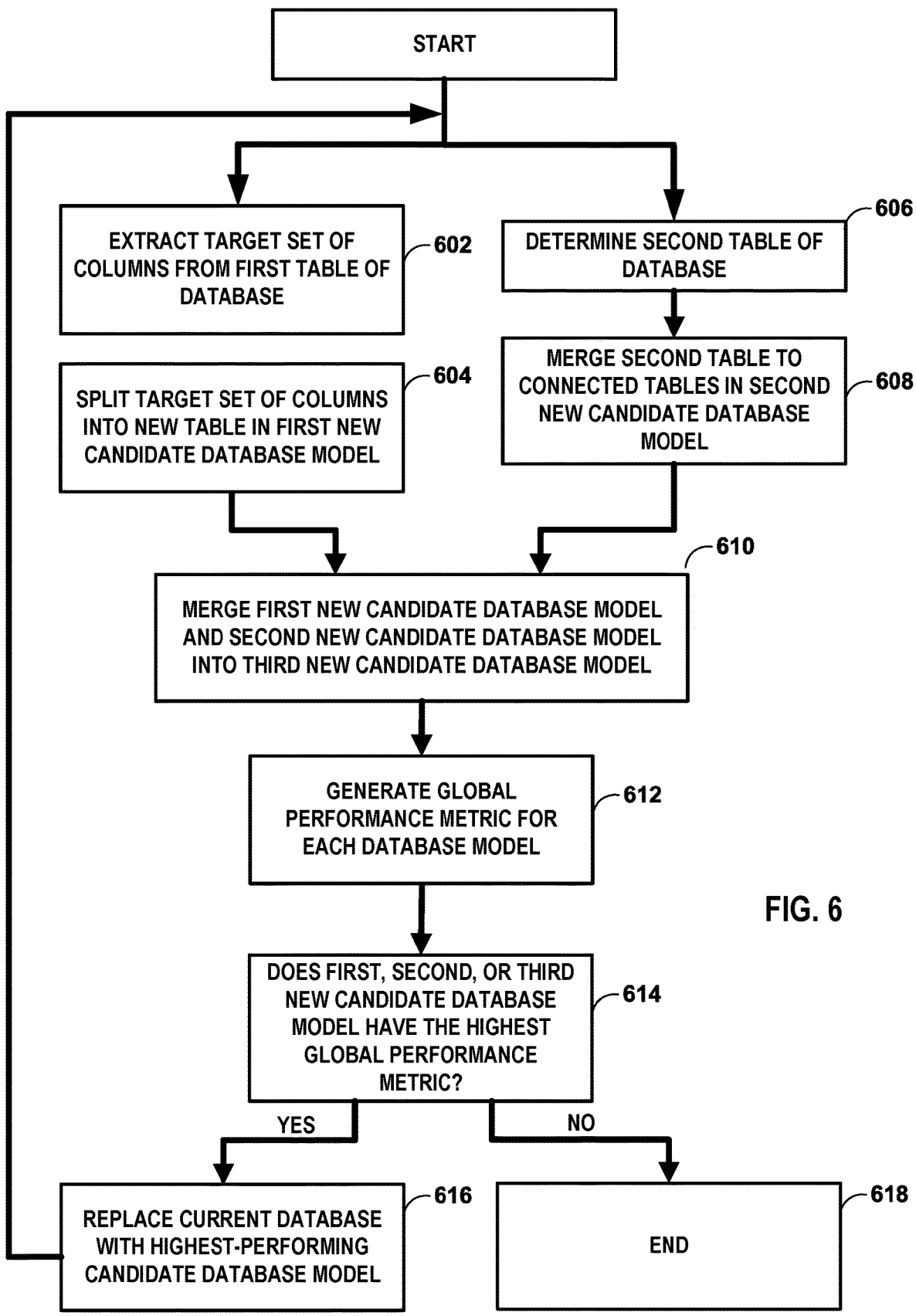
FIG. 6 is a flowchart illustrating another example database-refinement process, in accordance with one or more aspects of the techniques disclosed.

FIG. 6 is a flowchart illustrating another example database-refinement process, in accordance with one or more aspects of the techniques of this disclosure. FIG. 6 is described with respect to the example computing system 200 described in FIG. 2 and the example databases depicted in FIGS. 1 and 4A-4C. In general, FIG. 6 differs from FIG. 5 by evaluating three new candidate database models instead of two new candidate database models.

Database-refiner module 224 of computing system 200 is configured to identify and extract (e.g., remove) a set of columns 402 from a table 404A of a database 100 (602). For example, refiner 224 may identify the table 404A within database 100 having the largest (above-threshold) amount of duplicated and redundant data within its columns 402. Refiner 224 generates a first new candidate database model 410A for database 100 by creating a new table 406 and populating the new table with the identified set of columns 402 (604).

Similarly, refiner 224 is configured to identify at least one "unnecessary" table 412 of database 100 that has contributed to (e.g., resulted in) below-threshold-performance queries (606). Refiner 224 generates a second new candidate database model 410B for database 100 by merging the data previously stored within the identified table 412 into surrounding related (e.g., interconnected) tables 414A, and eliminating the identified table 412 in order to form merged table 414B (608). Refiner 224 further generates a third new candidate database model 410C by incorporating the modifications from both the first new candidate database model 410A and the second new candidate database model 410B (610).

Refiner 224 generates global-performance (GP) metrics for the current model of database 100, the first new candidate database model 410A, the second new candidate database model 410B, and the third new candidate database model 410C (612). The GP metrics may indicate, for example, both the query performance for each database model and the data-storage efficiency for each database model. Refiner 224 may compare the GP metrics for each of the models and determines whether the first, second, or third new candidate database models 410A-410C has the highest GP metric (614). If one of the first, second or third new candidate database models 410A-410C has the highest GP metric, e.g., is the highest-performing of the four models ("YES" branch of 614), refiner 224 replaces the "current" database model with the highest-performing candidate database model (616), and begins a subsequent iteration of the database-refinement process. If, however, refiner 224 determines none of the first, second, or third new candidate database models 410A-410C has the highest GP metric, or in other words, that the "current" database structure is higher-performing than all three of the "new" candidate database models 410 ("NO" branch of 614), then an improved database structure has been achieved and refiner 224 takes no further refinement action (618).

Figure 7:
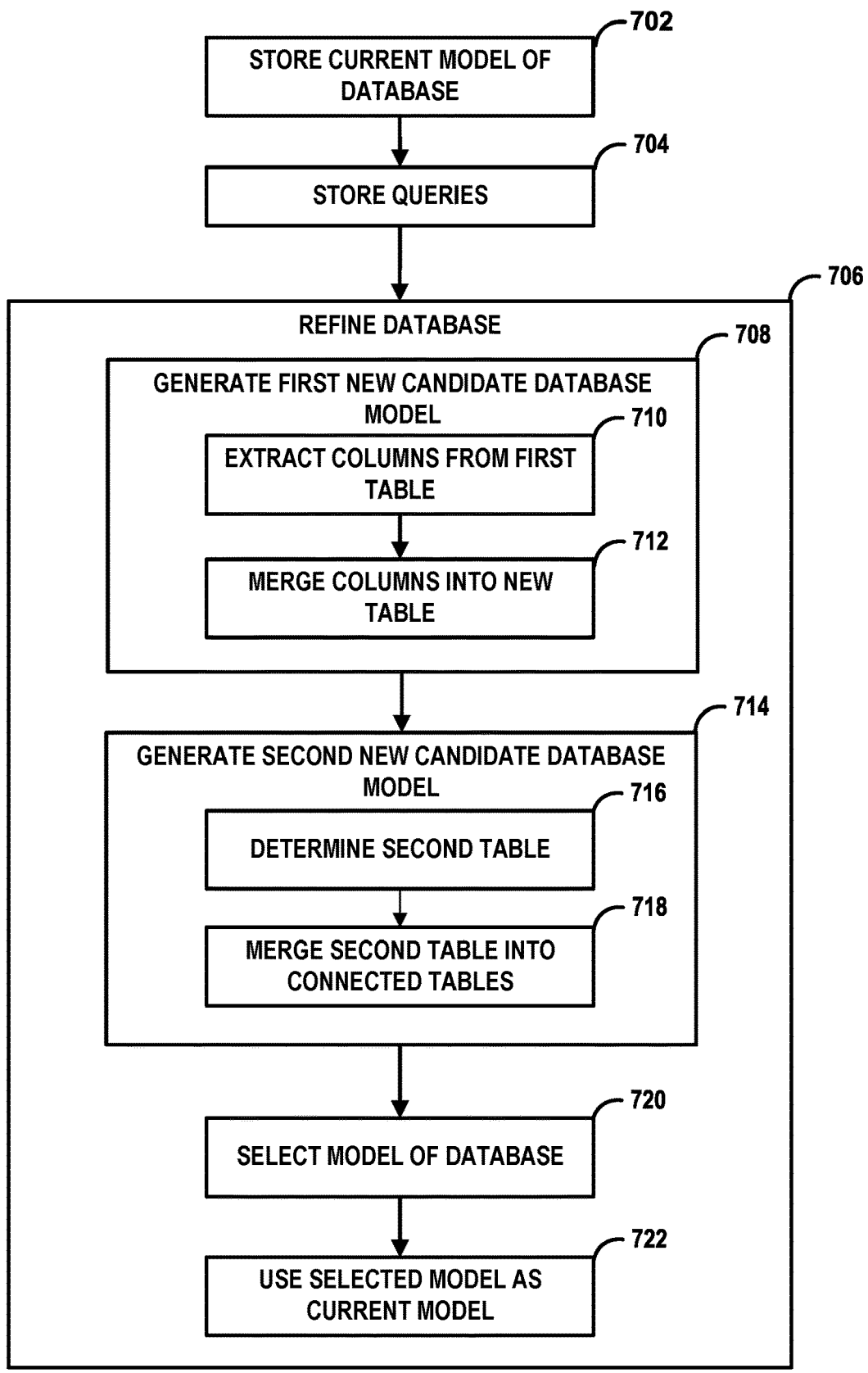
FIG. 7 is a flowchart illustrating another example database-refinement process, in accordance with one or more aspects of the techniques disclosed.

FIG. 7 is a flowchart illustrating another example database-refinement process, in accordance with one or more aspects of the techniques of this disclosure. FIG. 7 is described with respect to the example computing system 200 described in FIG. 2 and the example databases depicted in FIGS. 1 and 4A-4C.

In the example of FIG. 7, computing system 200 stores a "current" model of a database 100 comprising one or more tables 108 (702). Computing system 200 further stores a set of one or more queries 220 that characterize data 102 to retrieve from database 100 (704).

Computing system 200 then performs a database-refinement process (706) to improve the structure, schema, or model of database 100 with respect to one or more parameters, such as query performance and/or data-storage efficiency. As part of performing the database-refinement process (706), computing system 200 may perform a process (708) to generate a first new candidate database model 410A (FIG. 4A) of database 100. In some examples, when performing the process (708) to generate the first new candidate database model 410A of database 100, computing system 200 may extract a target set of columns 402 (FIG. 4A) from a first table 404A (FIG. 4A) of the current model of database 100 (710). Additionally, as shown in the lower portion of FIG. 4A, computing system 200 may merge, in the first new candidate database model 410A of database 100, the target set of columns 402 into a new table 406 of the first new candidate database model (712).

In some examples, as part of performing the process (708) to generate the first new candidate database model 410A of database 100, computing system 200 may, for each respective column of the first table 404A, determine, based on a number of distinct values in the respective column and a total number of rows in the respective column, a Column Selectivity (CS) score for the respective column 402 (e.g., as shown in Equation (3), above). Furthermore, computing system 200 may determine the target set of columns 402 based on the CS scores for the columns of the first table 404A of the current model of database 100.

In some examples, to determine the target set of columns 402 based on the CS scores for the columns of the first table 404A of the current model of database 100, computing system 200 may, for each respective column of the first table 404A, determine a Table Selectivity (TS) score for the respective column based on a number of distinct values in the respective column of the first table and a number of rows in the respective column of the first table (e.g., as shown in Equation (4), above). Additionally, computing system 200 may determine a set of one or more joint groups of columns. The CS score for each column in each of the joint groups of columns is below a predefined selectivity threshold. Computing system 200 may determine a TS score for each of one or more joint groups of columns. In some such examples, determining the target set of columns 402 based on the CS scores for the columns of the first table 404A of the current model of database 100 further includes determining, by computing system 200, the target set of columns 402 as being one of the joint groups of columns having a lowest TS score.

In some examples, the database-refinement process (706) further includes performing, by computing system 200, a process (714) to generate a second new candidate database model 410B for database 100. In some examples, when performing the process (714) to generate the second new candidate database model 410B for database 100, computing system 200 may determine (or identify) a second table (e.g., table 412 of FIG. 4B) of the current model of database 100 based on a number of columns of the second table that are involved in "where" or "join" clauses of the queries (716). Additionally, as part of generating the second new candidate database model 410B for database 100, computing system 200 may merge, in the second new candidate database model 410B for database 100, the second table 412 with one or more connected tables 414A of database 100. The one or more connected tables 414A are connected to the second table 412 at by least one of the "where" or the "join" clauses of the queries (718).

In some examples, when determining (e.g., identifying) the second table 412, computing system 200 may determine percentages of columns in tables 108 of the current model of database 100 that are involved in the "where" clauses or "join" clauses of queries 220. In such examples, computing system 200 may determine the second table 412 as being the table of the current model of database 100 that has the greatest percentage of columns in the tables 108 of the current model of database 100 that are involved in the "where" clauses or "join" clauses of the queries.

In some examples, when performing the database-refinement process (706), computing system 200 may select a model of database 100 from among a set of models of the database that includes the current model of database 100, the first new candidate database model 410A for database 100, and the second new candidate database model 410B for database 100 (720). In some examples, but not all examples, the set of models of database 100 further includes a third new candidate database model 410C for database 100 based on a merger of the first new candidate database model 410A for database 100 and the second new candidate database model 410B for database 100. In some examples, selecting the model of database 100 (720) includes determining, by computing system 200 and for each respective model of database 100 in the set of models of database 100, a global score for the respective model of the database; and selecting the model based on the global scores for the models of database 100.

For example, determining the global score for the respective model of database 100 may include, for each respective model of database 100 in the set of models of database 100 that includes the first new candidate database model 410A, the second new candidate database model 410B, and the current model of database 100 calculating a Database Query Performance (DQP) coefficient for the respective model of database 100 (e.g., as shown in Equation (2)). The DQP for the respective model of database 100 relates to how efficiently the tables in the respective model of database 100 are used for retrieving the information characterized by the queries. Furthermore, computing system 200 may calculate a Database Selectivity (DS) score for the respective model of database 100 that relates to an amount of duplicated data stored in the tables in the respective model of database 100 (e.g., as shown in Equation (5)). Computing system 200 may calculate the global score for the respective model of database 100 based on the DQP for the respective model of the database and the DS score for the respective model of the database (e.g., as shown in Equation (6)).

In some examples, when calculating the DQP for the respective model of database 100, computing system 200 calculates, for each respective query of the set of queries 220, a Query Performance Coefficient (QPC) that indicates a number of the plurality of tables in the respective model of database 100 that are used primarily for filtering data for the respective query or that are used primarily as bridge tables for the respective query (e.g., as shown in Equation (1)). Computing system 200 may calculate the DPC for the respective model of database 100 by averaging the QPCs for the queries.

In some examples, when calculating the QPC for the respective query, computing system 200 may, for each respective table of the plurality of tables used in the respective query, calculate the QPC for the respective query based on a total number of columns in the respective table, a number of columns of the respective table that were used in a "select" statement in the respective query, a number of columns of the respective table that were used in a "join" statement in the respective query, a number of columns of the respective table that were used in a "where" statement in the respective query; and a weight for the respective table when the number of the columns used in a "select" statement in the respective query is equal to zero.

In some examples, when calculating the DS score for the respective model of the database, computing system 200 may, for each respective table of the respective model of database 100, determine a Table Selectivity (TS) score for the respective table (e.g., as described in Equation (4)). Additionally, computing system 200 may determine the DS score for the respective model of the database based on the TS scores for the tables of the respective model of database 100 (e.g., as described in Equation (5)).

In some examples, when determining the TS score for the respective table computing system 200 may, for each respective column of the respective table, determine a Column Selectivity (CS) score for the respective column based on a number of distinct values in the respective column of the respective table and a total number of rows in the respective column of the respective table. Computing system 200 may determine the TS score for the respective table based on an average of the CS scores for the columns of the respective table.

In some examples, the database-refinement process (706) further includes using, by computing system 200, the selected model of database 100 as the current model of database 100 (722). In some examples, computing system 200 iteratively repeats the database-refinement process (706) one or more times. For example, computing system 200 may perform the process (708) to generate the first new candidate model 410A of database 100 two or more times; and may perform the process (714) to generate the second new candidate model 410B of database 100 two or more times.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units or engines is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
   storing, by a computing system, a set of one or more queries that characterize data to retrieve from a database comprising one or more tables;
   performing, by the computing system, a database-refinement process for restructuring the database, wherein the database-refinement process comprises:
      performing, by the computing system, a process to generate a first new candidate model of the database, wherein the process to generate the first new candidate model of the database comprises:
         removing, by the computing system, a target set of columns from a first table of a current model of the database; and
         merging, by the computing system, in the first new candidate model of the database, the target set of columns into a new table of the database;
      performing, by the computing system, a process to generate a second new candidate model of the database, wherein generating the second new candidate model of the database comprises:
         determining, by the computing system, a second table of the current model of the database based on a number of columns of the second table that are involved in "where" or "join" clauses of the set of one or more queries; and
         merging, by the computing system, in the second new candidate model of the database, the second table with one or more connected tables of the database, wherein the one or more connected tables are connected to the second table at by least one of the "where" or the "join" clauses of the set of one or more queries;
      selecting, by the computing system, a restructured model of the database from among a set of restructured models of the database that includes the first new candidate model of the database and the second new candidate model of the database, wherein the restructured model of the database is selected based on relative performance of the restructured models of the database with respect to the set of one or more queries and with respect to amounts of duplicated data in the restructured models of the database; and
      using, by the computing system, the selected restructured model of the database as the current model of the database.

2. The method of claim 1, wherein the set of restructured models of the database further includes a third new candidate model of the database based on a merger of the first new candidate model of the database and the second new candidate model of the database.

3. The method of claim 1,
   wherein the method further comprises, for each respective restructured model of the database in the set of restructured models of the database, determining, by the computing system, a global score for the respective restructured model of the database, wherein the global score of the respective model of the database is based on performance of the respective restructured model of the database with respect to the set of one or more queries and an amount of duplicated data in the respective restructured model of the database; and
   wherein selecting the restructured model of the database comprises selecting, by the computing system, the restructured model of the database based on the global scores for the restructured models of the database.

4. The method of claim 3, wherein, for each respective restructured model of the database in the set of restructured models of the database determining the global score for the respective restructured model of the database comprises:
   calculating, by the computing system, a Database Query Performance (DQP) coefficient for the respective restructured model of the database, that indicated the performance of the respective restructured model of the database with respect to the set of one or more queries, and wherein the DQP for the respective restrctured model of the database relates to how efficiently the tables in the respective restructured model of the database are used for retrieving the data characterized by the set of one or more queries;
   calculating, by the computing system, a Database Selectivity (DS) score for the respective restructured model of the database that indicates the amount of duplicated data in the respective restructured model of the database, and wherein the DS score relates to an amount of duplicated data stored in the tables in the respective restructured model of the database; and
   calculating, by the computing system, the global score for the respective restructured model of the database based on the DQP for the respective restructured model of the database and the DS score for the respective restructured model of the database.

5. The method of claim 4, wherein calculating the DQP for the respective restructured model of the database comprises:
   calculating, for each respective query of the set of one or more queries, a Query Performance Coefficient (QPC) that indicates a number of the plurality of tables in the respective restructured model of the database that are used primarily for filtering data for the respective query or that are used primarily as bridge tables for the respective query; and
   calculating the DPC for the respective restructured model of the database by averaging the QPCs for the set of one or more queries.

6. The method of claim 5, wherein calculating the QPC for the respective query comprises calculating the QPC based on, for each respective table of the plurality of tables used in the respective query:
   a total number of columns in the respective table;
   a number of columns of the respective table that were used in a "select" statement in the respective query;
   a number of columns of the respective table that were used in a "join" statement in the respective query;
   a number of columns of the respective table that were used in a "where" statement in the respective query; and a weight for the respective table when the number of the columns used in a "select" statement in the respective query is equal to zero.

7. The method of claim 4, wherein calculating the DS score for the respective restructured model of the database comprises:
for each respective table of the respective restructured model of the database, determining, by the computing system, a Table Selectivity (TS) score for the respective table; and
determining, by the computing system, the DS score for the respective restructured model of the database based on the TS scores for the tables of the respective restructured model of the database.

8. The method of claim 7, wherein determining the TS score for the respective table comprises:
for each respective column of the respective table, determining, by the computing system, a Column Selectivity (CS) score for the respective column based on a number of distinct values in the respective column of the respective table and a total number of rows in the respective column of the respective table; and
determining, by the computing system, the TS score for the respective table based on an average of the CS scores for the columns of the respective table.

9. The method of claim 1, wherein performing the process to generate the first new candidate model of the database further comprises:
for each respective column of the first table, determining, by the computing system, based on a number of distinct values in the respective column and a total number of rows in the respective column, a Column Selectivity (CS) score for the respective column; and
determining, by the computing system, the target set of columns based on the CS scores for the columns of the first table of the current model of the database.

10. The method of claim 9, wherein determining the target set of columns based on the CS scores for the columns of the first table of the current model of the database comprises:
for each respective column of the first table, determining, by the computing system, a Table Selectivity (TS) score for the respective column based on a number of distinct values in the respective column of the first table and a number of rows in the respective column of the first table;
determining, by the computing system, a set of one or more joint groups of columns, wherein the CS score for each column in each of the joint groups of columns is below a predefined selectivity threshold; and
determining, by the computing system, a TS score for each of one or more joint groups of columns, and
determining, by the computing system, the target set of columns as being one of the joint groups of columns having a lowest TS score.

11. The method of claim 1, wherein determining the second table comprises:
determining, by the computing system, percentages of columns in the tables of the current model of the database that are involved in the where clauses or join clauses of the set of one or more queries; and
determining, by the computing system, the second table as the table of the current model of the database that has the greatest percentage of columns in the tables of the current model of the database that are involved in the where clauses or join clauses of the set or one or more queries.

12. The method of claim 1, further comprising iteratively repeating, by the computing system, the database-refinement process one or more times.

13. The method of claim 1, wherein performing the database-refinement process for restructuring the database comprises:
performing, by the computing system, the process to generate the first new candidate model of the database two or more times; and
performing, by the computing system, the process to generate the second new candidate model of the database two or more times.

14. A computing system comprising processing circuitry and a storage system, the processing circuitry configured to:
store a set of one or more queries that characterize data to retrieve from a database comprising one or more tables;
perform a database-refinement process for restructuring the database, wherein the processing circuitry is configured to, as part of performing the database-refinement process:
perform a process to generate a first new candidate model of the database, wherein the processing circuitry is configured to, as part of performing the process to generate the first new candidate model of the database:
remove a target set of columns from a first table of a current model of the database; and
merge, in the first new candidate model of the database, the target set of columns into a new table of the database;
perform a process to generate a second new candidate model of the database, wherein the processing circuitry is configured to, as part of generating the second new candidate model of the database:
determine a second table of the current model of the database based on a number of columns of the second table that are involved in "where" or "join" clauses of the set of one or more queries; and
merge in the second new candidate model of the database, the second table with one or more connected tables of the database, wherein the one or more connected tables are connected to the second table by at least one of the "where" or the "join" clauses of the set of one or more queries;
select a restructured model of the database from among a set of restructured models of the database that includes the first new candidate model of the database and the second new candidate model of the database, wherein the restructured model of the database is selected based on relative performance of the restructured models of the database with respect to the set of one or more queries and with respect to amounts of duplicated data in the restructured models of the database; and
use the selected restructured model of the database as the current model of the database.

15. The computing system of claim 14,
wherein the processing circuitry is further configured to, for each respective restructured model of the database in the set of restructured models of the database, determine a global score for the respective restructured model of the database, wherein the global score for the respective restructured model of the database is based on performance of the respective restructured model of the database with respect to the set of one or more queries and an amount of duplicated data in the respective restructured model of the database;

and wherein selecting the restructured model of the database comprises selecting the restructured model of the database based on the global scores for the restructured models of the database.

16. The computing system of claim 15, wherein, for each respective restructured model of the database in the set of restructured models of the database, the processing circuitry is configured to, as part of determining the global score for the respective restructured model of the database:
calculate a Database Query Performance (DQP) coefficient for the respective restructured model of the database that indicates the performance of the respective restructured model of the database with respect to the set of one or more queries, and wherein the DQP for the respective restructured model of the database relates to how efficiently the tables in the respective restructured model of the database are used for retrieving the data characterized by the set of one or more queries;
calculate a Database Selectivity (DS) score for the respective restructured model of the database that indicates the amount of duplicated data in the respective restructured model of the database, and wherein the DS score relates to an amount of duplicated data stored in the tables in the respective restructured model of the database; and
calculate the global score for the respective model of the database based on the DQP for the respective restructured model of the database and the DS score for the respective restructured model of the database.

17. The computing system of claim 16, wherein the processing circuitry is configured to, as part of calculating the DQP for the respected restructed model of the database:
calculate, for each respective query of the set of one or more queries, a Query Performance Coefficient (QPC) that indicates a number of the plurality of tables in the respective restructured model of the database that are used primarily for filtering data for the respective query or that are used primarily as bridge tables for the respective query; and
calculating the DPC for the respective restructured model of the database by averaging the QPCs for the set of one or more queries.

18. A non-transitory, computer-readable medium comprising instructions that, when executed, are configured to cause processing circuitry of a computing system to:
store a set of one or more queries that characterize data to retrieve from a database comprising one or more tables;
perform a database-refinement process for restructuring the database, wherein the database-refinement process comprises:
performing a process to generate a first new candidate model of the database, wherein the process to generate the first new candidate model of the database comprises:
removing a target set of columns from a first table of a current model of the database; and
merging, in the first new candidate model of the database, the target set of columns into a new table of the database;
performing a process to generate a second new candidate model of the database, wherein generating the second new candidate model of the database comprises:
determining a second table of the current model of the database based on a number of columns of the second table that are involved in "where" or "join" clauses of the set of one or more queries; and
merging in the second new candidate model of the database, the second table with one or more connected tables of the database, wherein the one or more connected tables are connected to the second table by at least one of the "where" or the "join" clauses of the set of one or more queries;
selecting a restructured model of the database from among a set of restructured models of the database that includes the first new candidate model of the database and the second new candidate model of the database, wherein the restructured model of the database is selected based on relative performance of the restructured models of the database with respect to the set of one or more queries and with respect to amounts of duplicated data in the restructured models of the database; and
using the selected restructured model of the database as the current model of the database.

19. The non-transitory, computer-readable medium of claim 18,
wherein the instructions are further configured to cause the processing circuitry to, for each respective restructured model of the database in the set of restructured models of the database, determine a global score for the respective restructured model of the database, wherein the global score for the respective restructured model of the database is based on performance of the respective restructured model of the database with respect to the set of one or more queries and an amount of duplicated data in the respective restructured mode of the database; and
wherein selecting the restructured model of the database comprises selecting the restructured model of the database based on the global scores for the restructured models of the database.

20. The non-transitory, computer-readable medium of claim 19, wherein, for each respective restructured model of the database in the set of restructured models of the database determining the global score for the respective restructured model of the database comprises:
calculating a Database Query Performance (DQP) coefficient for the respective restructured model of the database that indicates the performance of the respective restructured model of the database with respect to the set of one or more queries, and wherein the DQP for the respective restructured model of the database relates to how efficiently the tables in the respective restructured model of the database are used for retrieving the data characterized by the set of one or more queries;
calculating a Database Selectivity (DS) score for the respective restructured model of the database that indicates the amount of duplicated data in the respective restructured mode of the database, and wherein the DS score relates to an amount of duplicated data stored in the tables in the respective restructured model of the database; and
calculating the global score for the respective restructured model of the database based on the DQP for the respective restructured model of the database and the DS score for the respective restructured model of the database.

* * * * *

UNITED STATES PATENT AND TRADEMARK OFFICE
CERTIFICATE OF CORRECTION

PATENT NO. : 11,886,404 B2
APPLICATION NO. : 17/144906
DATED : January 30, 2024
INVENTOR(S) : Vicente Rubén Del Pino Ruiz et al.

It is certified that error appears in the above-identified patent and that said Letters Patent is hereby corrected as shown below:

In the Specification

Column 19, Line 60: Replace "Computing system 200 may calculate the DPC for the" with -- Computing system 200 may calculate the DQP for the --

In the Claims

Column 22, Line 7 (Claim 3): Replace "score of the respective model of the database" with -- score for the respective restructured model of the database --

Column 22, Line 19 (Claim 4): Replace "models of the database determining" with -- models of the database, determining --

Column 22, Line 23 (Claim 4): Replace "restructured model of the database, that indicated the" with -- restructured model of the database that indicates the --

Column 22, Line 48 (Claim 5): Replace "number of the plurality" with -- number of a plurality --

Column 22, Line 53 (Claim 5): Replace "calculating the DPC for the respective" with -- calculating the DQP for the respective --

Column 23, Line 66 (Claim 11): Replace "clauses of the set or one or more" with -- clauses of the set of one or more --

Column 25, Line 32 (Claim 17): Replace "DQP for the respected restructed model" with -- DQP for the respective restructured model --

Column 25, Line 35 (Claim 17): Replace "indicates a number of the plurality" with -- indicates a number of a plurality --

Signed and Sealed this
Twenty-third Day of April, 2024

Katherine Kelly Vidal
*Director of the United States Patent and Trademark Office*

CERTIFICATE OF CORRECTION (continued)
U.S. Pat. No. 11,886,404 B2

Column 25, Line 40 (Claim 17): Replace "calculating the DPC for" with -- calculating the DQP for --

Column 26, Line 40 (Claim 20): Replace "models of the database" with -- models of the database, --

Column 26, Line 56 (Claim 20): Replace "restructured mode of the database" with -- restructured model of the database --